United States Patent
Ikedo et al.

(10) Patent No.: US 6,356,525 B1
(45) Date of Patent: Mar. 12, 2002

(54) SKEW ADJUSTING APPARATUS FOR AN OPTICAL DISC PLAYER

(75) Inventors: Yuji Ikedo; Yusuke Akama; Akira Bessho; Katsuhiko Tanimoto, all of Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/444,369

(22) Filed: Nov. 22, 1999

(30) Foreign Application Priority Data

Dec. 28, 1998  (JP) ............................................ 10-371999

(51) Int. Cl.⁷ ............................................... G11B 19/00
(52) U.S. Cl. ...................................... 369/219; 369/244
(58) Field of Search .................................. 369/219, 249, 369/244, 44.13, 44.21, 223; 360/267.4, 267.5, 267.6, 267.7, 267.8

(56) References Cited

U.S. PATENT DOCUMENTS

| | | | | |
|---|---|---|---|---|
| 3,969,768 A | * | 7/1976 | Ebbing | 360/267.4 |
| 4,097,908 A | * | 6/1978 | Chou et al. | 360/76 |
| 5,008,873 A | * | 4/1991 | Tanaka et al. | 369/44.14 |
| 5,307,339 A | * | 4/1994 | Tanaka | 369/215 |
| 5,493,560 A | * | 2/1996 | Kim | 369/215 |
| 5,768,248 A | * | 6/1998 | Lee | 369/219 |
| 5,982,735 A | * | 11/1999 | Tsai | 369/219 |
| 5,995,479 A | * | 11/1999 | Takizawa et al. | 369/219 |
| 5,889,755 A | * | 3/2000 | Kim | 369/219 |
| 6,044,057 A | * | 3/2000 | Park | 369/219 |
| 6,046,974 A | * | 4/2000 | Uehara | 369/219 |
| 6,058,098 A | * | 5/2000 | Kato | 369/219 |

FOREIGN PATENT DOCUMENTS

| | | | | |
|---|---|---|---|---|
| JP | 0098881 | * | 4/1988 | |
| JP | 0108572 | * | 5/1988 | |
| JP | 0108573 | * | 5/1988 | |
| JP | 0188831 | * | 8/1988 | |
| JP | 0123529 | * | 5/1990 | |
| JP | 0179927 | * | 7/1990 | |
| JP | 0214024 | * | 8/1990 | |
| JP | 0063937 | * | 3/1991 | |
| JP | 404109433 A | * | 4/1992 | |
| JP | 405298707 A | * | 11/1993 | |
| JP | 405303749 A | * | 11/1993 | |

OTHER PUBLICATIONS translation for PTO of Kouzumi (JP 02–214024).*

* cited by examiner

*Primary Examiner*—David Davis
*Assistant Examiner*—Franklin D. Altman, III
(74) *Attorney, Agent, or Firm*—Young & Thompson

(57) ABSTRACT

A skew adjusting apparatus for an optical disc player makes a positional adjustment of a guide member of a carriage for a pickup relative to a chassis. A movable body is disposed on the chassis. The movable body has at one end thereof a supporting member for the guide member and the other end thereof a connection member to the chassis. An adjusting device for making a positional adjustment of the guide member through the supporting member in the thickness direction of the chassis is disposed between the chassis and the movable body so as to be displaced from the guide member and the supporting member on a reference plane of the chassis.

13 Claims, 11 Drawing Sheets

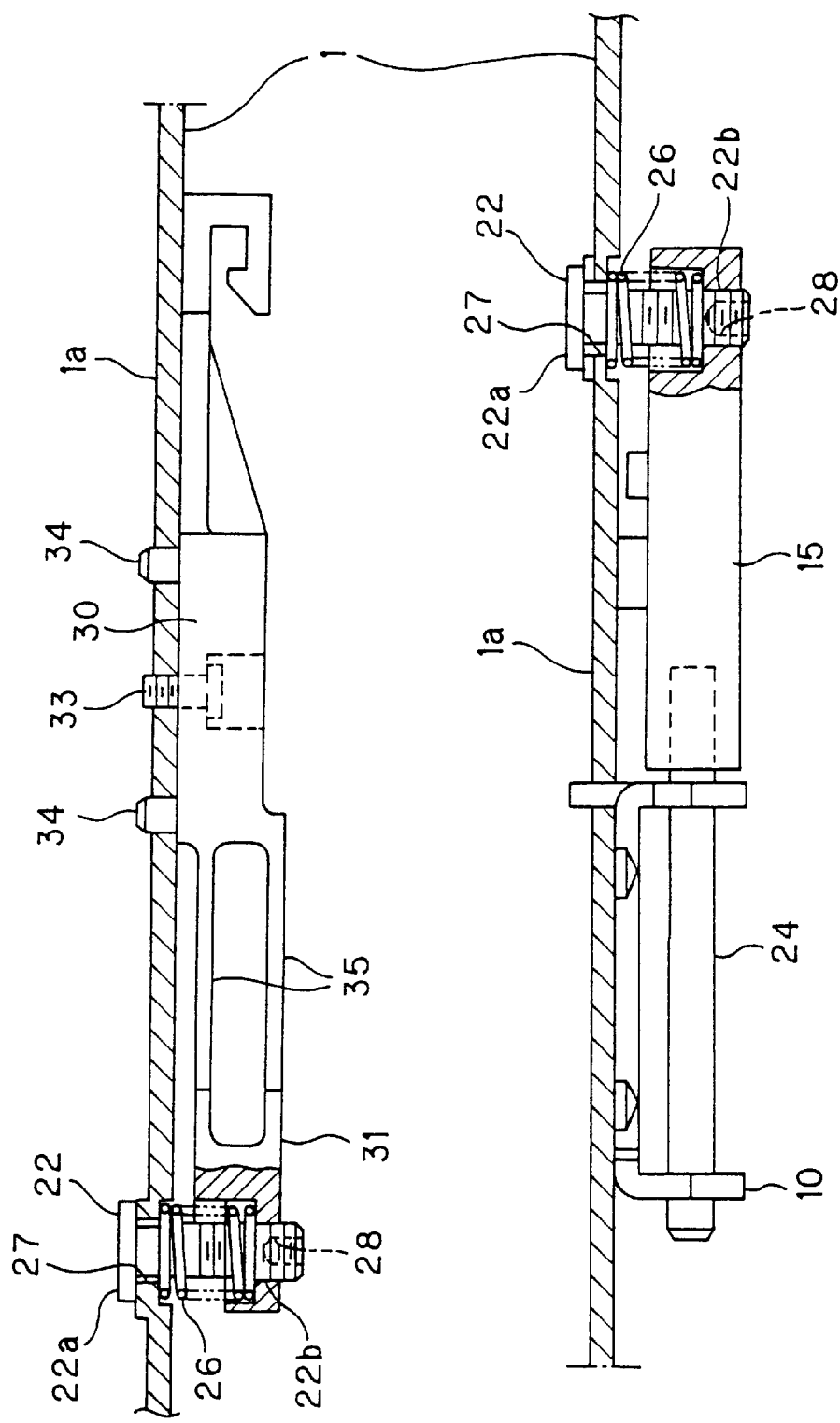

# SKEW ADJUSTING APPARATUS FOR AN OPTICAL DISC PLAYER

BACKGROUND OF THE INVENTION

1. Field of the Invention

The present invention relates to a skew adjusting apparatus for an optical disc player, and more specifically to a skew adjusting apparatus for making an adjustment of a positional relationship between a disc and an optical axis of an objective lens of a pickup.

2. Description of the Related Art

When a disc from which information can be read by an optical disc player is a medium such as a DVD (digital video disc) having fine pits, a permissible range of a positional relationship between the surface of the disc and the optical axis of the objective lens of the pickup of the optical disc player becomes narrow. As a result, in the manufacturing process of DVD players or the like, it is required to carry out a skew adjustment treatment of making a fine positional adjustment of a guide shaft after mounting the guide shaft and the other components on the chassis or making a fine positional adjustment of a turntable for the disc. For example, a fine adjustment of the guide shaft can be carried out by moving the end of the guide shaft in the direction of the optical axis of the objective lens of the pickup so that the optical axis of the objective lens becomes perpendicular to the surface of the disc.

There has conventionally been known a skew adjusting apparatus described in Japanese Patent Application No. H10-222,009, in which a positional adjustment of an optical axis was made by moving a guide shaft of a carriage during manufacturing optical disc players. In such an apparatus, the end of the guide shaft is held in the vertical direction between the lower end of a compression coil spring mounted on a bracket fixed on the chassis and the front end of an adjusting screw screwed on the chassis, and the end of the guide shaft is supported in a longitudinal groove of the bearing mounted on the chassis so as to be movable up and down. The turning operation of the adjusting screw to move it in the thickness direction (i.e., in the vertical direction) of the chassis thereon causes the end of the guide shaft to move in the vertical direction on the chassis, thus making a skew adjustment.

However, in the conventional skew adjusting apparatus, the adjusting screw, the bearing, the compression coil spring and the bracket are disposed so as to be placed one upon another in the direction of the optical axis of the objective lens, i.e., in the thickness direction of the chassis, resulting in increased thickness of the optical disc player. Especially, in case of the portable player, such a structure makes it hard to decrease the thickness of the player, thus causing a problem.

SUMMARY OF THE INVENTION

An object of the present invention is therefore to provide a skew adjusting apparatus for an optical disc player, which permits to decrease the thickness of the optical disc player.

In order to attain the aforementioned object, the skew adjusting apparatus of the present invention, for making a positional adjustment of a guide member of a carriage for a pickup relative to a chassis has the following features:

a movable body is disposed on said chassis, said movable body having at one end thereof a supporting member for said guide member and at another end thereof a connection member to said chassis; and an adjusting device for making a positional adjustment of said guide member through said supporting member in a thickness direction of said chassis is disposed between said chassis and said movable body so as to be displaced from said guide member and said supporting member on a reference plane of said chassis.

The connection member of said movable body may pivotably be connected to said chassis through a pivot shaft that is in parallel with said reference plane so that the positional adjustment of said guide member can be made by swinging said movable body around said pivot shaft by means of said adjusting device.

The movable body may have flexibility so that the positional adjustment of said guide member can be made by bending said movable body by means of said adjusting device.

The guide member may comprise a screw shaft for transmitting a driving force to said carriage; and the supporting member of said movable body may comprise a bearing for said screw shaft.

The screw shaft may be connected to an output shaft of a motor through a gear train; and the gear train may comprise a drive gear fixed to said output shaft, a driven gear fixed to said screw shaft and an intermediate gear engaging with said drive gear and said driven gear, said intermediate gear being movable along an arc having a central point, which is identical to a central axis of said pivot shaft.

BRIEF DESCRIPTION OF THE DRAWINGS

FIG. 10 is a cross-sectional view cut along the line X—X in FIG. 7;

DETAILED DESCRIPTION OF THE PREFERRED EMBODIMENTS

Now, embodiments of a skew adjusting apparatus for an optical disc player of the present invention will be described in detail below with reference to the accompanying drawings.

Figure 1:
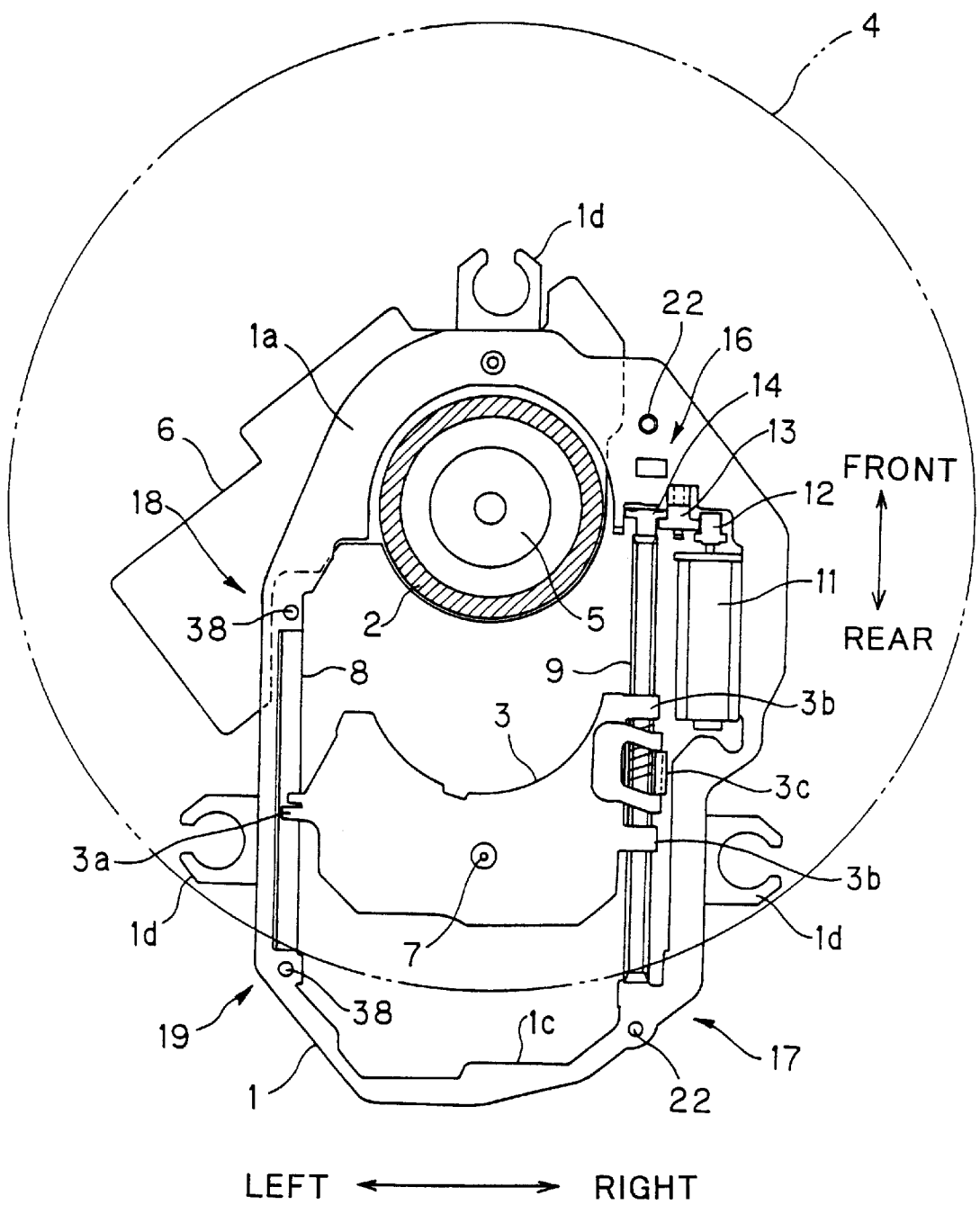
FIG. 1 is a plan view illustrating a chassis and its surrounding components of an optical disc player provided with a skew adjusting apparatus of the embodiment of the present invention.
Figure 2:
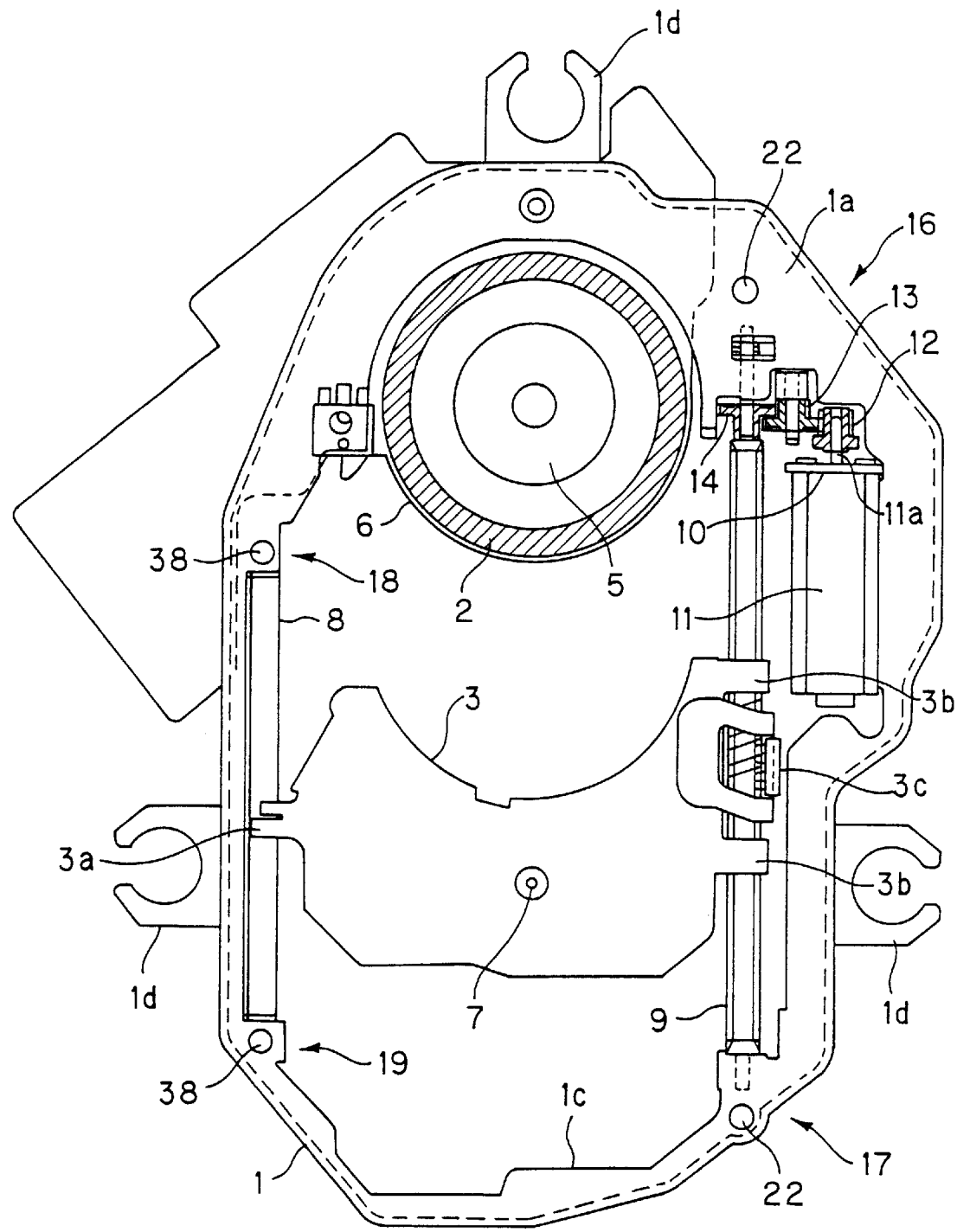
FIG. 2 is an enlarged view of the chassis and its surrounding components as shown in FIG. 1.
Figure 3:
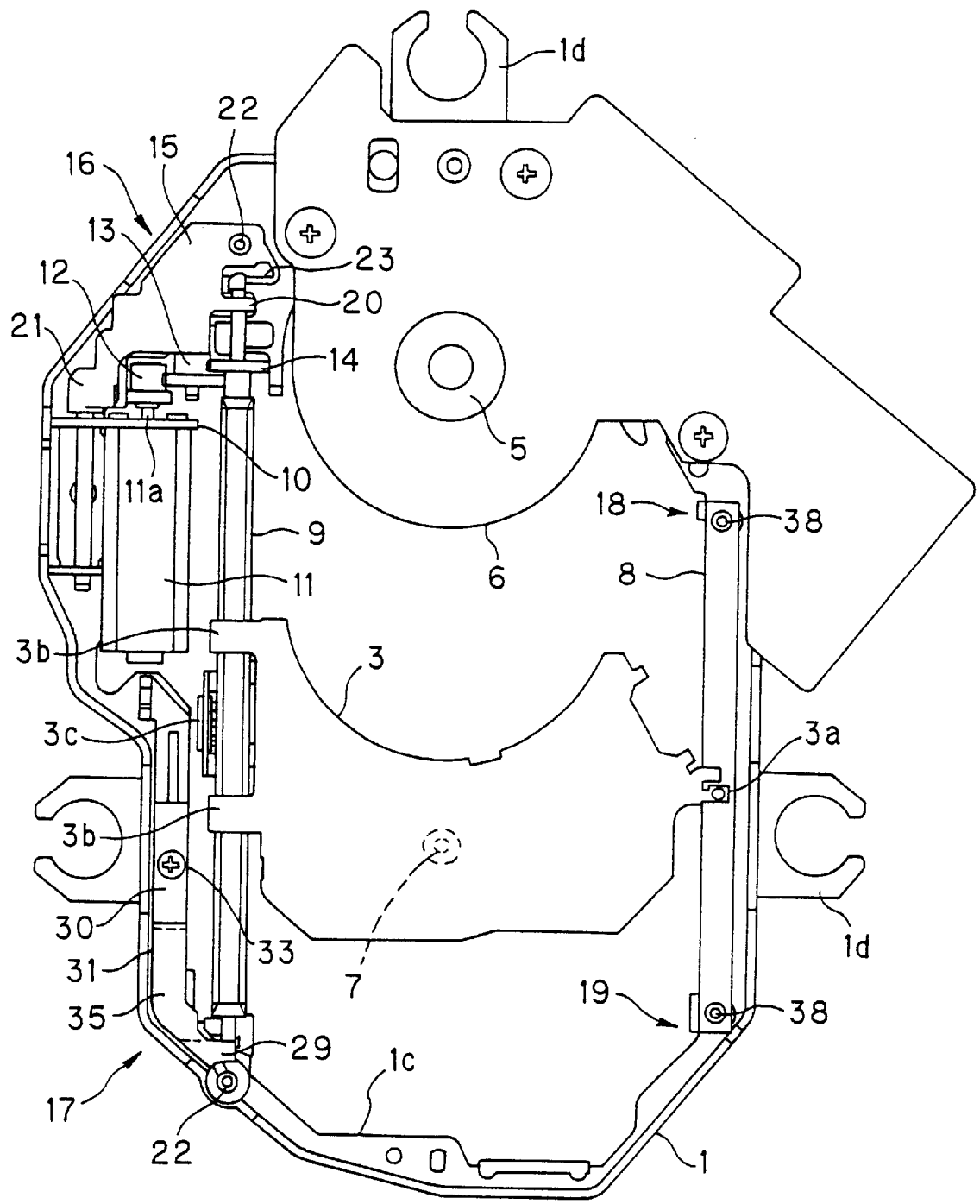
FIG. 3 is a bottom view of the chassis and its surrounding components as shown in FIG. 2.

As shown in FIGS. 1 to 3, an optical disc player is provided with a chassis 1 serving as the framework, and with a turntable 2, a carriage 3 and other components, which are mounted on the chassis 1.

Figure 4:
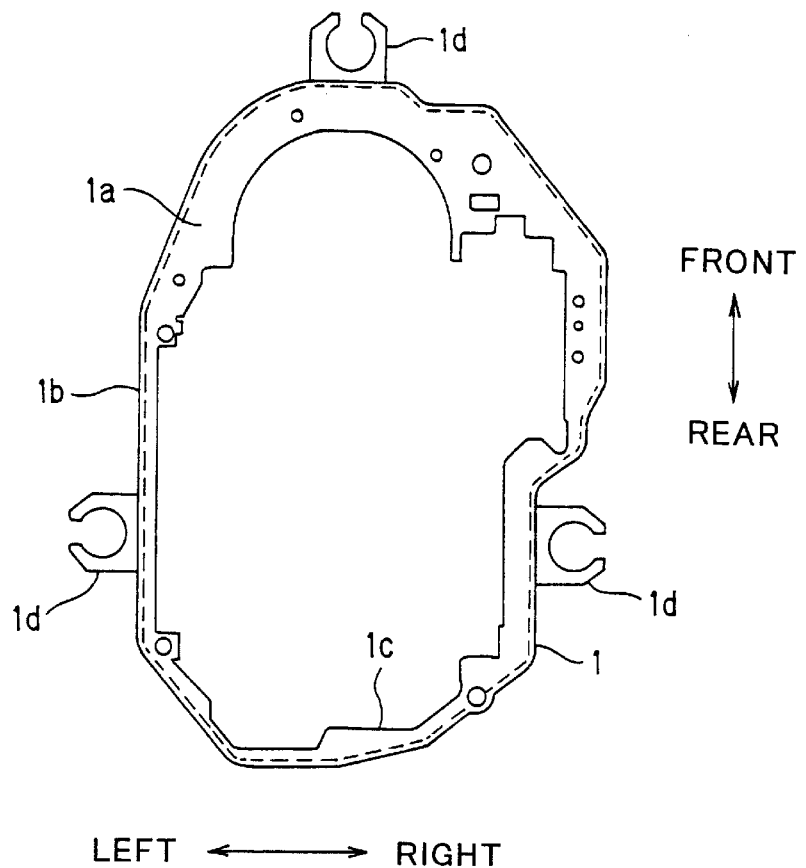
FIG. 4 is a plan view of the chassis.
Figure 5:
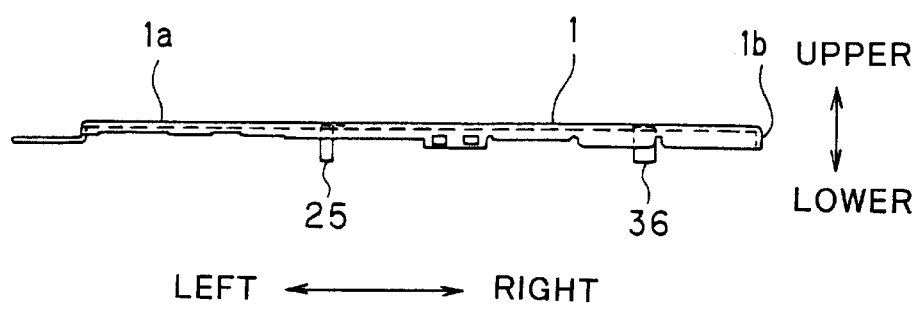
FIG. 5 is a left-hand side view of the chassis as shown in FIG. 4.

The chassis 1 can be obtained by subjecting for example a metallic plate to a press-forming method or the like to punch it so as to form a rectangular frame-shape as shown in FIGS. 4 and 5. The chassis 1 obtained by the press-forming method or the like has a horizontal reference plane 1a and a rim 1b, which is formed on the periphery of the chassis 1 so as to project downward. In this embodiment, the chassis 1 is designed to have an appropriate shape and size to a portable optical disc player. A reference numeral "1d" in FIGS. 4 and 5 indicate arms for mounting the chassis 1 in a housing (not shown) of the optical disc player.

The turntable 2 is a disc-shaped body on which an optical disc 4 is to be placed. A turntable-driving motor 5 may rotate the turntable 2. As shown in FIGS. 1 to 3, the turntable 2 is supported at a prescribed position, which locates in the front side of a central opening 1c of the chassis 1 by mounting the turntable-driving motor 5 and a supporting plate 6 therefor on the chassis 1.

The carriage 3 supports at its central portion an objective lens 7 of a pickup as shown in FIGS. 1 to 3. The carriage 3 is disposed in the central opening 1c of the chassis 1 so as to be movable forward and backward.

Guide shafts 8, 9 are provided on the opposite sides of the central opening 1c of the chassis 1, respectively. The guide shafts 8, 9 serve as a guide member for guiding the carriage 3 forward and backward. The one guide shaft 8 is a round-shaped bar and the other guide shaft 9 serves also as a screw shaft. The use of the other guide shaft 9 serving as the screw shaft permits to omit the corresponding guide shaft formed of a round-shaped bar, thus making it possible to provide a small and lightweight structure of the optical disc player and especially to reduce the horizontal size of the optical disc player. The opposite guide shafts 8, 9 are disposed in parallel with each other so that the optical axis of the objective lens 7 on the carriage 3, which is guided by means of the guide shafts 8, 9, can move on the turntable or on a plane perpendicular to the reference plane 1a of the chassis 1, which includes the rotational axis of the optical disc 4 placed on the turntable 2. Fork-shaped arms 3a, 3b having recessed portions project from the left and right side edges of the carriage 3 toward the respective guide shafts 8, 9 so as to receive the guide shafts 8, 9 in their recessed portions, which open in the horizontal direction. A nut portion 3c projects from the right hand edge of the carriage 3 toward the guide shaft 9 that also serve as the screw shaft so as to engage with the guide shaft 9.

Figure 6:
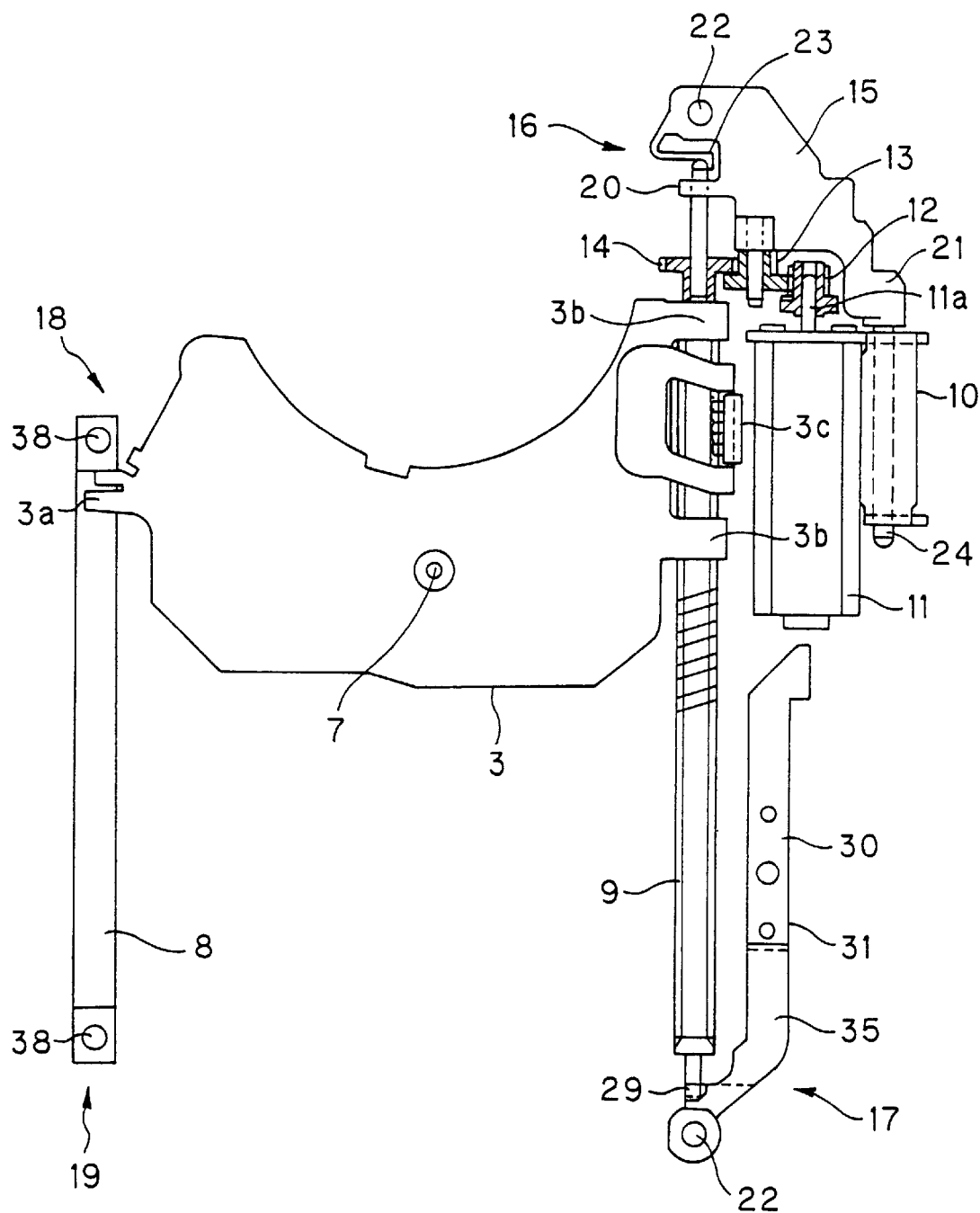
FIG. 6 is a plan view of the components as shown in FIG. 2 from which the chassis and the turntable are omitted.

The guide shaft 9 also serving as the screw shaft can rotate by means of a carriage-driving motor 11, which is mounted on the chassis 1 through a bracket 10. Accordingly, the guide shaft 9 is dynamically connected with the output shaft 11a of the carriage-driving motor 11 through a gear train, which is composed of a drive gear 12, a secondary intermediate gear 13 and a driven gear 14. As shown in FIG. 6, the drive gear 12 is fixed to the output shaft 11a of the carriage-driving motor 11, the intermediate gear 13 is pivotably supported on a movable body 15 described later and the driven gear 14 is fixed to the guide shaft 9. The operation of the carriage-driving motor 11 causes the guide shaft 9 to rotate clockwise or counterclockwise. As a result, the carriage 3 can move forward or backward on the chassis 1 along the opposite guide shafts 8, 9 so that the objective lens 7 mounted on the carriage 3 can cross the optical disc 4 in its radius direction, which is placed on the turntable 2.

It is necessary to arrange the carriage 3 so that the optical axis of the objective lens 7 is perpendicular to the recording surface of the optical disc 4 as mentioned above, in order to scan the optical disc 4 by an irradiated light through the objective lens 7. The optical disc player is provided with skew adjusting apparatus for ensuring such an arrangement.

The skew adjusting apparatus have a system of making a skew adjustment of the optical axis of the objective lens 7 by adjusting the position of the guide shafts 8, 9 relative to the chassis 1. The skew adjusting apparatus are provided in the vicinity of the both ends of the respective guide shafts 8, 9 as shown in FIGS. 1, 2, 3, 6 and 7. More specifically, the first skew adjusting apparatus 16 is provided in a position of the right and front side on the chassis 1. The second skew adjusting apparatus 17 is provided in a position of the right and rear side on the chassis 1. The third skew adjusting apparatus 18 is provided in a position of the left and front side on the chassis 1. The fourth skew adjusting apparatus 19 is provided in a position of the left and rear side on the chassis 1. The first and second skew adjusting apparatus 16 and 17 are used for adjusting the right-hand guide shaft 9. The third and fourth skew adjusting apparatus 18 and 19 are used for adjusting the left-hand guide shaft 8. Any one of the first to fourth skew adjusting apparatus 16, 17, 18 and 19 may be omitted. The third and fourth skew adjusting apparatus 18 and 19 may be substituted by the first and second skew adjusting apparatus 16 and 17.

In the first skew adjusting apparatus 16, the movable body 15 is disposed on the chassis 1. The movable body 15 has at one end thereof a bearing 20, which serves as a supporting member for the guide shaft 9, and at the other end thereof a connection member 21 to the chassis 1. A skew screw 22 and the other components of an adjusting device for making a positional adjustment of the guide shaft 9 through the bearing 20 in the thickness direction of the chassis 1, i.e., in the vertical direction thereof are disposed between the chassis 1 and the movable body 15. The bearing 20, the connection member 21, the skew screw 22 and the other components of the adjusting device are on the same plane so as to locate along the reference plane 1a of the chassis 1.

The movable body 15 is formed of a plate-shaped block having a contour, which is identical with the reference plane 1a of the right and front portion of the chassis 1, as shown in FIGS. 3, 6, 7 and 9.

Figure 9:
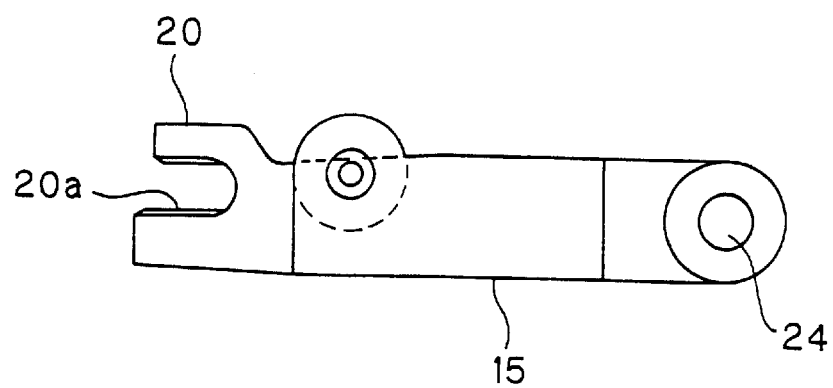
FIG. 9 is a side view of the movable body having a viewpoint of a gear train side.

The bearing 20 is provided at the left-hand end of the movable body 15. The bearing 20 is formed into a fork-shape, which has a horizontal groove 20a extending from the left-hand side to the right-hand side on the chassis 1 as shown in FIG. 9. The end of the guide shaft 9 is slidably inserted into the horizontal groove 20a of the bearing 20. The bearing 20 has the opposite crowned portions, which form the part of the horizontal groove 20a, so that the guide shaft 9 can incline also along the vertical plane, which is perpendicular to the central axis of the horizontal groove 20a. A thrust leaf spring 23 projects from the portion of the movable body 15, which is adjacent to the bearing 20. The tip end of the thrust leaf spring 23 comes into contact with the end of the guide shaft 9.

A pivot shaft 24 is fixed to the connection member 21 formed on the right-hand side of the movable body 15. The pivot shaft 24 is rotatably supported on the bracket 10 fixed on the chassis 1 so as to be placed in parallel with the reference plane 1a and the guide shaft 9. According to such a structure, the movable body 15 can move to make a reciprocating angular motion around the pivot shaft 24 on the reference plane 1a of the chassis 1. The guide shaft 9 is also subjected to the same motion through the bearing 20. An angle of the reciprocating angular motion corresponds to an adjusted amount according to the first skew adjusting apparatus 16.

Figure 7:
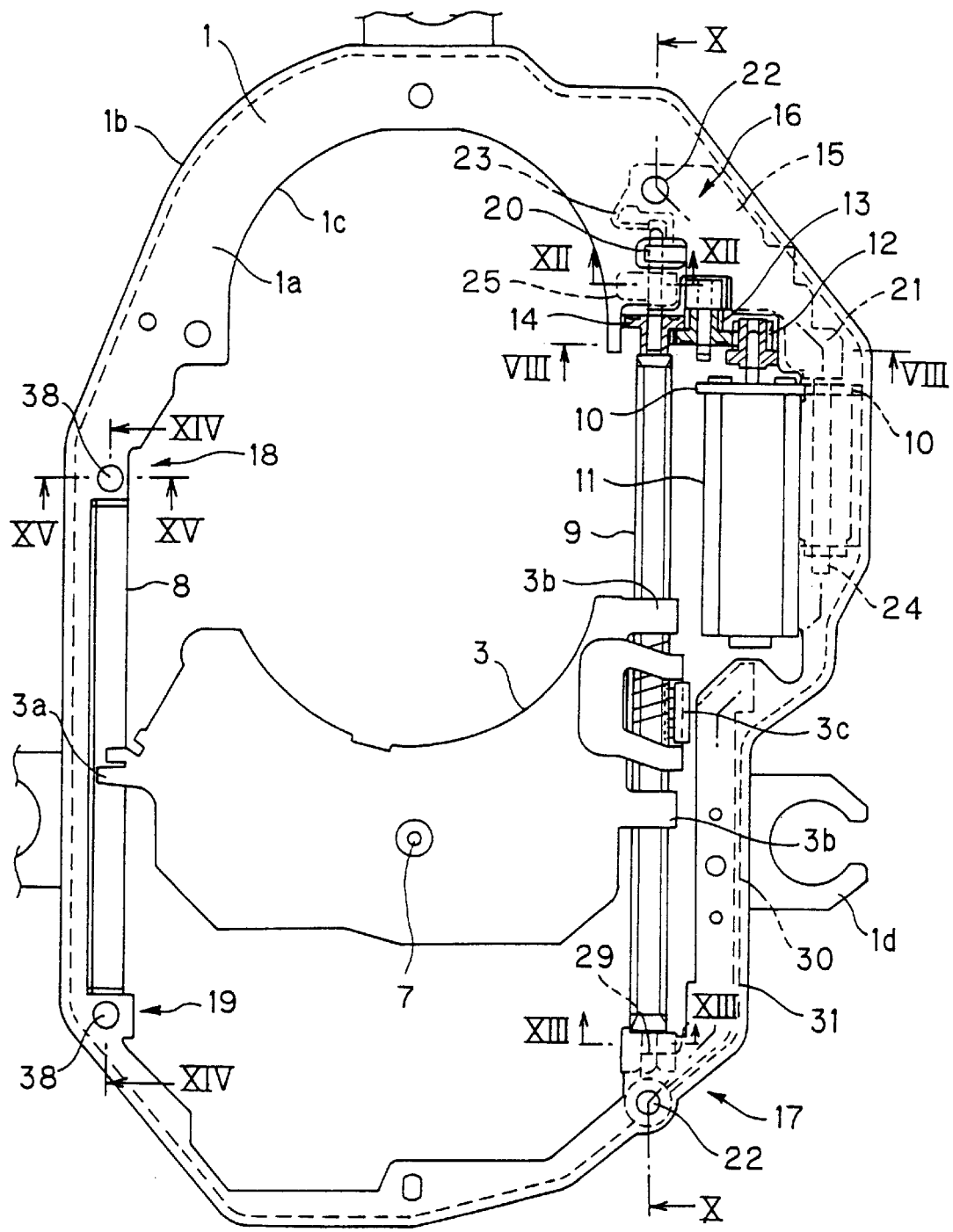
FIG. 7 is a plan view of the components as shown in FIG. 2 from which the turntable is omitted.
Figure 12:
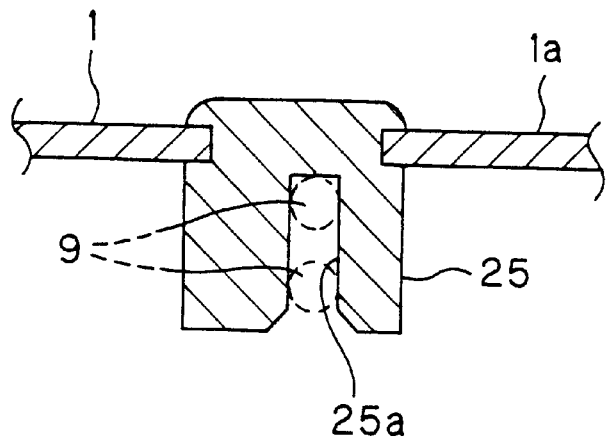
FIG. 12 is a cross-sectional view cut along the line XII—XII in FIG. 7.

A fork-shaped bearing 25 having a vertical groove 25a, which extends in the vertical direction relative to the chassis 1, is mounted on the chassis 1 as shown in FIGS. 7 and 12. The end of the guide shaft 9 is slidably inserted into the vertical groove 25a so as to prevent the guide shaft 9 from being displaced in the horizontal direction relative to the chassis 1 during the skew adjusting operation. The guide shaft 9 is supported not only by the bearing 20 having the horizontal groove 20a, but also by the bearing 25 having the vertical groove 25a in this manner. As a result, even when the movable body 15 swings upward or downward around the pivot shaft 25, the guide shaft 9 moves upward or downward along the plane perpendicular to the reference plane 1a of the chassis 1. Accordingly, the optical axis of the objective lens 7 mounted on the carriage 3, which is guided by the guide shaft 9, runs on the radius line of the optical disc 4, irrespective of an adjusted amount of skew.

Figure 8:
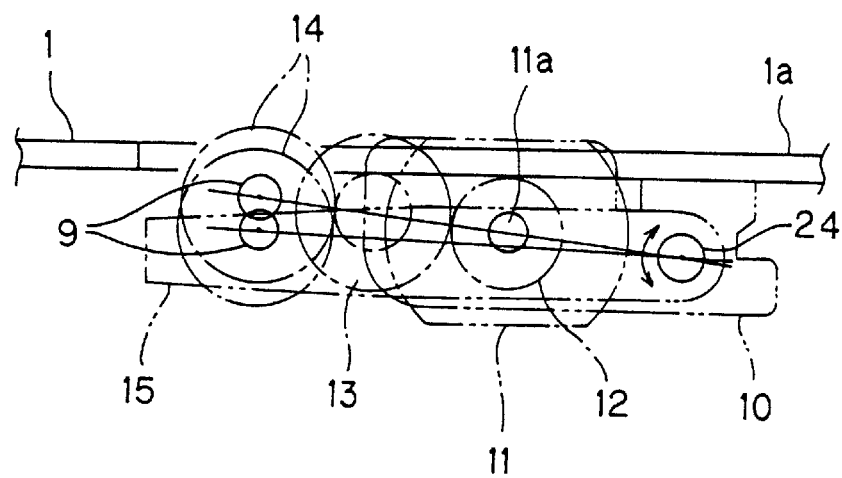
FIG. 8 is a view along the line VIII—VIII in FIG. 7.

When the movable body 15 swings around the pivot shaft 24 during the skew adjusting operation as shown in FIG. 8, the drive gear 12 rotates in a prescribed position on the chassis 1, the driven gear 14 mounted on the guide shaft 9 moves in a direction perpendicular to the reference plane 1a of the chassis 1 and the intermediate gear 13 moves along the arc having the central point, which is identical to the central axis of the pivot shaft 24. Accordingly, there occurs a pitch variation among the gears 12, 13 and 14. The gears 12, 13 and 14 are however designed and arranged so as to maintain an appropriate velocity ratio of the output shaft 11a of the motor 11 to the guide shaft 9, even when the pitch variation occurs.

The adjusting device is composed of the skew screw 22, which is disposed between the movable body 15 and the right and front portion of the chassis 1, and of the compression coil spring 26 serving as a resilient member, as shown in FIGS. 7 and 10. The skew screw 22 is inserted into a clearance hole 27 from the upper end thereof toward the lower end thereof. The head portion 22a of the skew screw 22 comes into contact with the upper surface of the chassis 1, thus limiting the fitting position of the skew screw 22. The threaded portion 22b of the skew screw 22 engages with a female threaded portion formed on the movable body 15, which locates below the chassis 1. The compression coil spring 26 is disposed between the chassis 1 and the movable body 15 so as to impart a resilient force to the movable body 15 to bring always the head portion 22a of the skew screw 22 into contact with the chassis 1, thereby limiting the fitting position of the skew screw 22. The threaded portion 22b of the skew screw 22 has at its tip end a polygonal recess 28, which opens downward. When the skew screw 22 is turned clockwise or counterclockwise with the use of a tool (not shown) the tip end of which is fitted into the polygonal recess 28 of the skew screw 22, the relative position of the threaded portion 22b thereof to the movable body 15 changes. As a result, the inclination angle of the movable body 15 to the chassis 1 changes in accordance with a rotational amount of the skew screw 22 so that the guide shaft 9 supported by the movable body 15 moves on the plane perpendicular to the reference plane 1a of the chassis 1.

The bearing 20, the connection member 21 and the adjusting device are on the same plane on the block, i.e., the movable body 15 so as to locate along the reference plane 1a of the chassis 1 as shown in FIGS. 6, 7 and 10. Especially, the skew screw 22 and the other components of the adjusting device are disposed on the reference plane 1a of the chassis so as to be displaced from the positions of the guide shaft 9 and the bearing 20 therefor. Such a specific structure makes it possible to reduce the thickness of the first skew adjusting apparatus 16, thus leading to reduction in the thickness of the optical disc player.

The second skew adjusting apparatus 17 has the similar structure as shown in FIGS. 3, 6 and 7 to the first skew adjusting apparatus 16, in which (i) a movable body 31, which has at one end thereof a bearing 29 for the guide shaft 9, and at the other end thereof a connection member 30 to the chassis 1, is disposed on the chassis 1; (ii) a skew screw 22 and the other components of an adjusting device for making a positional adjustment of the guide shaft 9 through the bearing 29 in the thickness direction of the chassis 1, i.e., in the vertical direction thereof are disposed between the chassis 1 and the movable body 31; and (iii) the bearing 29, the connection member 30, the skew screw 22 and the other components of the adjusting device are on the same plane so as to locate along the reference plane 1a of the chassis 1. However, the above-mentioned movable body 31 has flexibility so that the positional adjustment of the guide member (i.e., the guide shaft) 9 can be made by bending the movable body 31 by means of the adjusting device.

The movable body 31 is integrally formed of synthetic resin into a rectangular block as shown in FIGS. 3, 6, 7 and 11. The movable body 31 is mounted on the lower surface of the right and rear portion of the chassis 1.

Figure 11A:
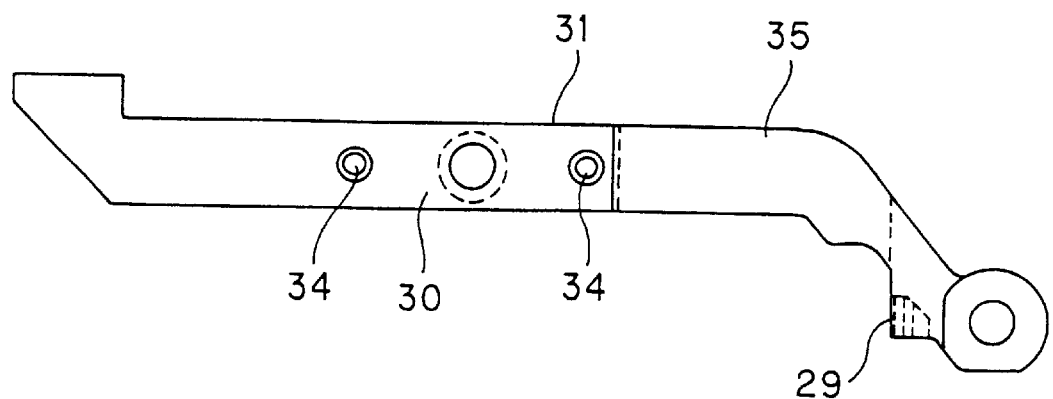
FIG. 11(A) is a plan view of the other movable body and FIG. 11(B) is a front view thereof.
Figure 11B:
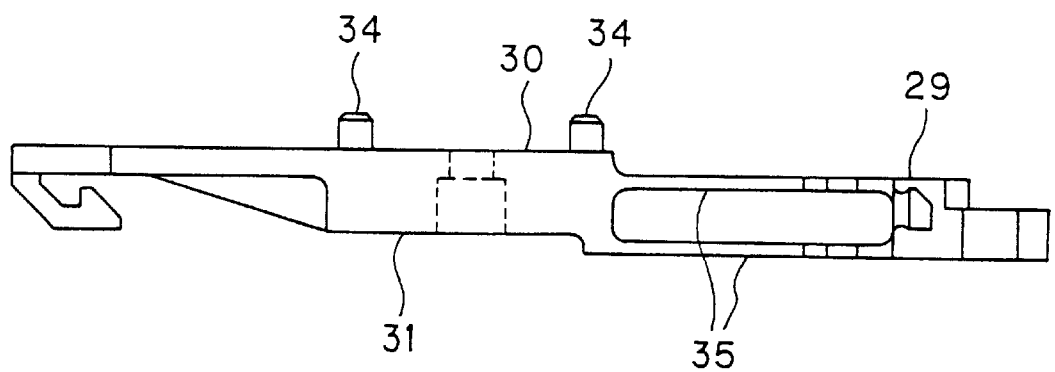

The bearing 29 formed on the rear end of the movable body 31 has a recess portion as shown in FIG. 11, into which the other end of the guide shaft 9 is inserted. The end of the guide shaft 9 is supported by the bearings 20 and 25 of the first skew adjusting apparatus 16 as mentioned above, and the other end of the guide shaft 9 is supported by the bearing 29 of the second skew adjusting apparatus 17.

The connection member 30 is provided on the rear portion of the movable body 31. The movable body 31 is supported on the chassis 1 by fixing the former to the latter by means of a mounting screw 33 and pins 34.

The movable body 31 has the opposite leaf spring portions 35, 35 formed between the bearing 29 and the connection member 30. The leaf spring portions 35, 35 of the movable body 31 can bend along the plane, which is in parallel with the guide shaft 9 and is perpendicular to the reference plane 1a of the chassis 1, as shown in FIGS. 3, 6 and 7. According to such a structure, the bearing 29 of the movable body 31 can move parallelly up and down, while maintaining substantially the horizontal condition below the chassis 1, by imparting a pressing force to the portion of the bearing 29 downward or releasing the pressing force. An amount of the parallel motion mentioned above corresponds to an adjusted amount according to the second skew adjusting apparatus 17.

Figure 13:
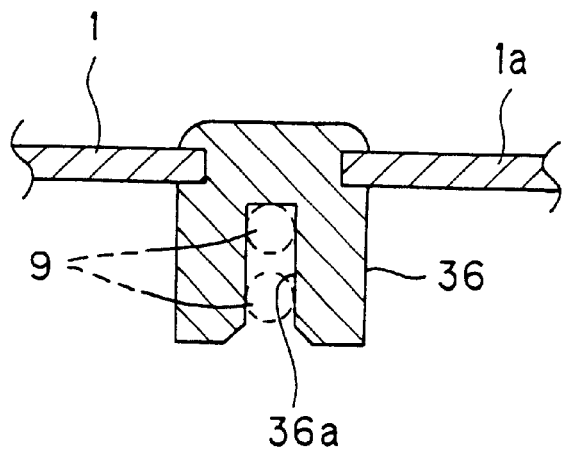
FIG. 13 is a cross-sectional view cut along the line XIII—XIII in FIG. 7.

A fork-shaped bearing 36 having a vertical groove 36a, which extends in the vertical direction relative to the chassis 1, is mounted on the lower surface of the chassis 1 as shown in FIG. 13. The end of the guide shaft 9 is slidably inserted into the vertical groove 36a so as to prevent the guide shaft 9 from being displaced in the horizontal direction relative to the chassis 1 during the skew adjusting operation. The guide shaft 9 is restricted not only by the bearing 29, but also by the bearing 36 having the vertical groove 36a in this manner. As a result, the guide shaft 9 moves upward or downward along the plane perpendicular to the reference plane 1a of the chassis 1, when the movable body 31 is deformed upward or downward. Accordingly, the optical axis of the objective lens 7 mounted on the carriage 3, which is guided by the guide shaft 9, runs on the radius line of the optical disc 4, irrespective of an adjusted amount of skew.

The adjusting device is disposed between the right and rear portion of the chassis 1 and the portion extended from the bearing 29 of the movable body 31 as shown in FIGS. 7 and 10. The adjusting device has the same construction as that of the first skew adjusting apparatus 16. The description of the same structural components to which the same reference numerals are given is omitted. When the skew screw 22 of the adjusting device is turned, the movable body 31 moves parallelly upward or downward below the chassis 1 in accordance with a rotational amount of the skew screw 22 so that the other end of the guide shaft 9, which is supported by the movable body 31 moves on the plane perpendicular to the reference plane 1a of the chassis 1 in the same manner.

The bearing 20, the connection member 30 and the adjusting device locate in the longitudinal direction on the same plane on the block, i.e., the movable body 15 so as to locate along the reference plane 1a of the chassis 1 as shown in FIGS. 6, 7, 10 and 11. Especially, the skew screw 22 and the other components of the adjusting device are disposed on the reference plane 1a of the chassis so as to be displaced from the positions of the guide shaft 9 and the bearing 29 therefor. Such a specific structure makes it possible to reduce the thickness of the first skew adjusting apparatus 17, thus leading to reduction in the thickness of the optical disc player.

Figure 14:
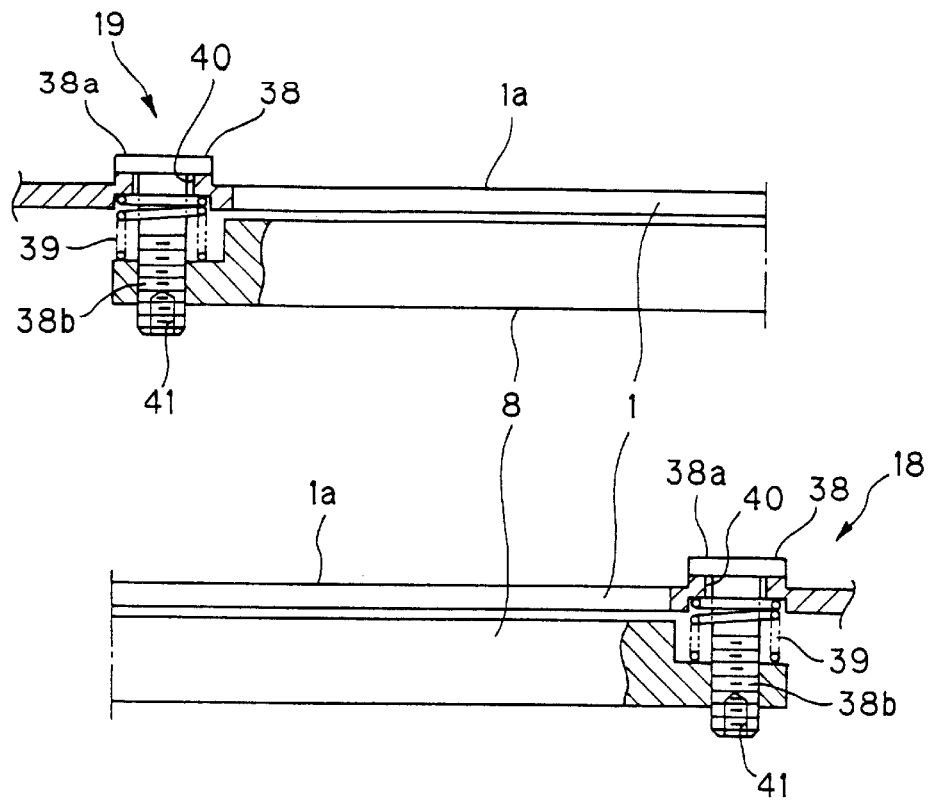
FIG. 14 is a cross-sectional view cut along the line XIV—XIV in FIG. 7.
Figure 15:
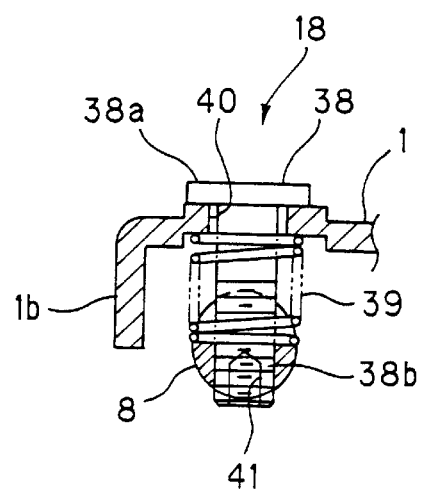
FIG. 15 is a cross-sectional view cut along the line XV—XV in FIG. 7.

The third and fourth skew adjusting apparatus 18 and 19 has only the component corresponding to the adjusting device, but has no components corresponding to the movable body 15 or 31, the bearing 20 or 29 and the other components in the first or second skew adjusting apparatus 16 or 17, as shown in FIGS. 7, 14 and 15.

The third skew adjusting apparatus 18 is composed of a skew screw 38, which is disposed between the left and front portion of the chassis 1 and the front end of the guide shaft 8, and of a compression coil spring 39 serving as the resilient member. The skew screw 38 is inserted into a clearance hole 40 from the upper end thereof toward the lower end thereof. The head portion 38a of the skew screw 38 comes into contact with the upper surface of the chassis 1, thus limiting the fitting position of the skew screw 38. The threaded portion 38b of the skew screw 38 engages with a female threaded portion formed on the front end of the guide shaft 8, which locates below the chassis 1. The compression coil spring 39 is disposed between the chassis 1 and the guide shaft 8 so as to impart a resilient force to the guide shaft 8 to bring always the head portion 38a of the skew screw 38 into contact with the chassis 1, thereby limiting the fitting position of the skew screw 38. The threaded portion 38b of the skew screw 38 has at its tip end a polygonal recess 41, which opens downward. When the skew screw 38 is turned clockwise or counterclockwise with the use of a tool (not shown) the tip end of which is fitted into the polygonal recess 41 of the skew screw 38, the relative position of the threaded portion 38b thereof to the guide shaft 8 changes. As a result, the guide shaft 8 can incline on the plane perpendicular to the reference plane 1a of the chassis 1 in accordance with a rotational amount of the skew screw 38.

The fourth skew adjusting apparatus 19 is disposed between the left and rear portion of the chassis 1 and the rear end of the guide shaft 8. The adjusting device has the same construction as that of the third skew adjusting apparatus 18. The description of the same structural components to which the same reference numerals are given is omitted. When the skew screw 38 of the fourth skew adjusting apparatus 19 is turned clockwise or counterclockwise, the guide shaft 8 can incline in the opposite direction to that as in the adjustment carried out with the use of the third skew adjusting apparatus 18.

Now, description will be given below of the skew adjusting operation with the use of the skew adjusting apparatus having the above-described structures.

After the optical disc player is assembled for example in the condition as shown in FIG. 1, the chassis 1 is fitted to the conventional skew adjusting machine. The skew adjusting machine makes height adjustments of the guide shafts 8, 9 and corrections of parallelism by inserting tools into the polygonal recesses 28, 28, 41, 41 of the four skew screws 22, 22, 38, 38, which project from the lower surface of the chassis 1 and turning the skew screws 22, 22, 38, 38 clockwise or counterclockwise.

Then, the optical disc 4 is placed on the turntable 2. The carriage-driving motor 11 starts and the carriage 3 moves below the optical disc 4 in the radius direction thereof. Information recorded on the recording surface of the optical disc 4 is read through the objective lens 7 mounted on the carriage 3 and the corresponding signals are supplied to the skew adjusting machine, during the above-mentioned movement of the carriage 3. The skew adjusting machine measures the jitter of the read information and turn the four skew screws 22, 22, 38, 38 clockwise or counterclockwise to make a skew adjustment so that the value indicated by a jitter meter becomes smallest.

In the adjusting operation, when the skew screw 22 of the first skew adjusting apparatus 16 turns, the movable body 15 swings upward or downward below the chassis 1 around the pivot shaft 24 and the front end of the right-hand guide shaft 9 moves upward or downward on the plane, which is perpendicular to the reference plane 1a of the chassis 1, around the bearing 29 locating on the rear side. When the skew screw 22 of the second skew adjusting apparatus 17 turns, the movable body 31 is deformed upward or downward below the chassis 1 and the rear end of the right-hand guide shaft 9 moves upward or downward on the plane, which is perpendicular to the reference plane 1a of the chassis 1, around the bearing 20 locating on the front side. When the skew screw 38 of the third skew adjusting apparatus 18 turns, the front end of the left-hand guide shaft 8 moves upward or downward on the plane, which is perpendicular to the reference plane 1a of the chassis 1 around the skew screw 38 locating on the rear side. When the skew screw 38 of the fourth skew adjusting apparatus 19 turns, the rear end of the left-hand guide shaft 8 moves upward or downward on the plane, which is perpendicular to the reference plane 1a of the chassis 1 around the skew screw 38 locating on the front side.

After the completion of the skew adjustment, the optical axis of the objective lens 7 mounted on the carriage 3, which is supported by the guide shafts 8, 9, are kept perpendicular to the recording surface of the optical disc 4, thus making it possible to read information in a proper manner.

According to the present invention as described in detail, it is possible to make a skew adjustment in a proper manner and to decrease the thickness of the optical disc player due to the structure in which the adjusting device is not placed on the guide member in the thickness direction of the chassis so as to be displaced from the guide member on the reference plane of the chassis.

When the movable body for supporting the guide member is swingable around the pivot shaft in the present invention, it is possible to make an accurate and smooth skew adjustment.

What is claimed is:

1. A skew adjusting apparatus for an optical disc player, for making a positional adjustment of a guide member of a carriage for a pickup relative to a chassis, wherein:

a movable body is disposed on said chassis, said movable body having at one end thereof a supporting member for said guide member and at another end thereof a connection member to said chassis; and an adjusting device for making a positional adjustment of said guide member through said supporting member in a thickness direction of said chassis is disposed between said chassis and said movable body so as to be displaced from said guide member and said supporting member on a reference plane of said chassis.

2. The apparatus as claimed in claim 1, wherein:

said connection member of said movable body is pivotably connected to said chassis through a pivot shaft that is in parallel with said reference plane so that the positional adjustment of said guide member can be made by swinging said movable body around said pivot shaft by means of said adjusting device.

3. The apparatus as claimed in claim 2, wherein:

said guide member comprises a screw shaft for transmitting a driving force to said carriage; and said supporting member of said movable body comprises a bearing for said screw shaft.

4. The apparatus as claimed in claim 3, wherein:

said screw shaft is connected to an output shaft of a motor through a gear train; and said gear train comprises a drive gear fixed to said output shaft, a driven gear fixed to said screw shaft and an intermediate gear engaging with said drive gear and said driven gear, said intermediate gear being movable along an arc having a central point, which is identical to a central axis of said pivot shaft.

5. The apparatus as claimed in claim 1, wherein:

said movable body has flexibility so that the positional adjustment of said guide member can be made by bending said movable body by means of said adjusting device.

6. The apparatus as claimed in claim 5, wherein:

said guide member comprises a screw shaft for transmitting a driving force to said carriage; and said supporting member of said movable body comprises a bearing for said screw shaft.

7. The apparatus as claimed in claim 1, wherein:

said guide member comprises a screw shaft for transmitting a driving force to said carriage; and said supporting member of said movable body comprises a bearing for said screw shaft.

8. A skew adjusting apparatus for an optical disc player, for making a positional adjustment of a guide member of a carriage for a pickup relative to a chassis having a reference plane, said apparatus comprising:

a movable body on said chassis, said movable body having a plate-shape having a longitudinal axis that extends along said reference plane, said movable body having at one end thereof a supporting member for said guide member and at another end thereof a connection member to said chassis; and an adjusting device for making a positional adjustment of said guide member by moving said supporting member in a thickness direction of said chassis, said adjusting device being between said chassis and said movable body so as to be displaced from said guide member and said supporting member on said reference plane of said chassis.

9. The apparatus of claim 8, further comprising a pivot about which said movable body rotates when said adjusting device moves said supporting member.

10. The apparatus of claim 9, wherein said adjusting device comprises a screw that changes a distance between said supporting member and said chassis when said screw is rotated.

11. An optical disc player comprising a skew adjusting apparatus for making a positional adjustment of a guide member of a carriage for a pickup relative to a generally flat chassis of the optical disc player, the apparatus comprising, a generally flat movable body having a longitudinal axis substantially parallel to a plane of said chassis, said movable body comprising a movable support for said guide member at one end to said movable body and a connection to said chassis at another end of said movable body, and an adjusting device that makes a positional adjustment of said guide member by moving said support in a thickness direction of said chassis.

12. The player of claim 11, further comprising a pivot about which said movable body rotates when said adjusting device moves said support.

13. The player of claim 12, wherein said adjusting device comprises a screw that changes a distance between said support and said chassis when said screw is rotated.

* * * * *